United States Patent [19]
Poerink

[11] 3,785,476
[45] Jan. 15, 1974

[54] PLATFORM CONVEYOR

[76] Inventor: Jannes Jonge Poerink, Postbus 4, Borne, Netherlands

[22] Filed: Oct. 6, 1971

[21] Appl. No.: 187,188

[30] Foreign Application Priority Data
Oct. 7, 1970 Germany................ P 20 49 129.6

[52] U.S. Cl. .............................................. 198/189
[51] Int. Cl. ........................................... B65g 17/08
[58] Field of Search ........................... 198/189, 204

[56] References Cited
UNITED STATES PATENTS

| | | | |
|---|---|---|---|
| 1,274,385 | 8/1918 | Colburn | 198/189 |
| 3,042,185 | 4/1962 | Welch | 198/204 |
| 3,269,526 | 8/1966 | Imse | 198/189 |
| 3,672,488 | 6/1972 | Collins | 198/189 |
| 3,674,130 | 7/1972 | Carmichael | 198/195 |

FOREIGN PATENTS OR APPLICATIONS

| | | | |
|---|---|---|---|
| 1,136,147 | 12/1956 | France | 198/189 |
| 206,288 | 2/1957 | Australia | 198/189 |

OTHER PUBLICATIONS

"Now Nylon," Rex Chainbelt Co., New Product Bulletin 55–65, Nov. 4, 1954.

"Zytel" DuPont Product Engineering Bulletin Volume 2, May, 1955.

*Primary Examiner*—Edward A. Sroka
*Attorney*—William E. Anderson et al.

[57] ABSTRACT

A platform conveyor is provided with a plurality of flat panels. Each of the panels has on its opposite edges closed eyes which are spaced from one another and integral with the panel. The eyes are insertable into the spaces between the eyes of an adjacent panel member and connectable by means of bars insertable through adjacent eyes.

2 Claims, 4 Drawing Figures

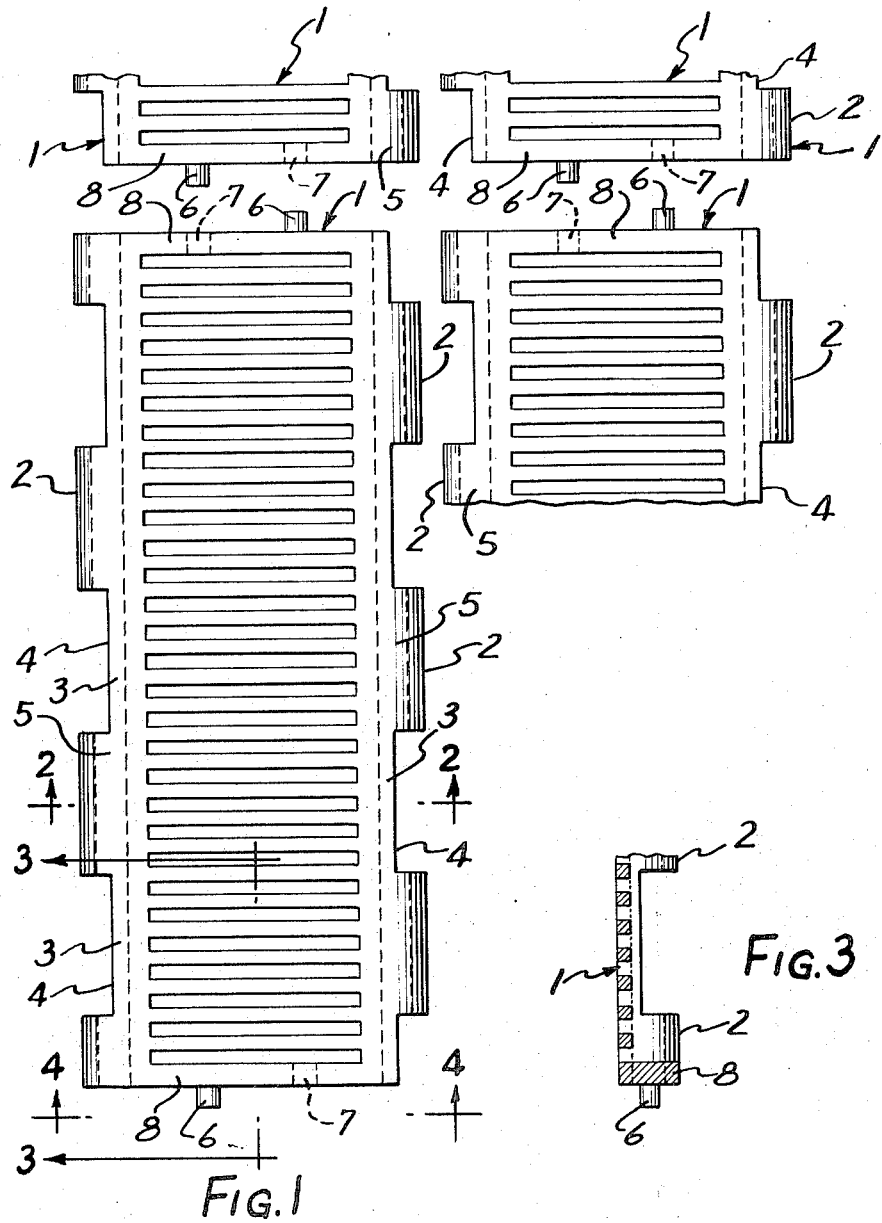
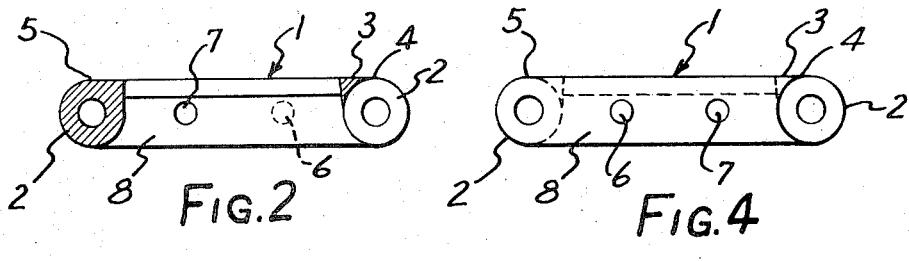

PLATFORM CONVEYOR

The present invention relates to a platform conveyor. It is directed at the problem of creating a conveyor system which is attractive in price, does justice to all requirements, is universally usable and pacticularly hygienic.

Very generally the platform conveyor comprises a multiplicity of flat or plate-shaped members which may be of plastic having on two opposite panel edges several closed eyes placed at a distance from each other. The panel members are connectable with one another by the eyes being insertable in each case into the interstices between the eyes of adjacent panel members and connectable with them with the aid of bars transverse to a conveyor belt's path.

As illustrated, the eyes are arranged below the alignment formed from the top or upper sides of the panel members.

Also as illustrated the upper surface of the panel members is provided in the interstices between the eyes with an edge having a curved recess for receiving the eyes of an adjacent panel. The upper tip of the edge extends to the apex of the eye to be inserted. For optical control of the material to be conveyed, by means of radiation, the panels may be made from a translucent plastic.

It also is possible for the panel members to have a grid structure or recesses of different shapes, depending on requirements for engaging the objects or materials to be conveyed.

The panel members may be provided with corrugated reinforcements or the like.

A plurality of panel members can be connected not only in series via their eyes but also can be juxtaposed via pin connections into conveyor belts of varying width.

If necessary, the panel members to be arranged on the outside of the assembly may have raised belt edges.

The disclosed platform conveyor offers a multiplicity of noteworthy advantages. Thus, the new belt may be made of attractively priced plastic. The assembly is extremely simple. The individual panel members can be assembled rapidly and simply. In contrast to the metal conveyor belts of prior art, only a few hinge points are present which require no lubrication. Due to the use of attractively priced plastic on the one hand, and the simple and rapid possibility of assembly on the other hand the new conveyor belt becomes very favorable in price.

The disclosed platform conveyor is very stable and very durable and designed so that it has a high load capacity and a high tensile strength. Because of the arrangement of closed eyes consisting of one piece integral with the panel members themselves, it is impossible for the eyes to bend out of shape even at high tensile stress.

When consisting entirely of plastic material, the conveyor belt is completely immune to corrosion. It can be cleaned extremely well and it is very hygienic due to the avoiding of gaps and intervals, so that it can be used in the vegetable and in the food business in general.

The plastic material may be selected in such a manner that the platform conveyor according to the invention is immune to temperatures to a very wide extent. The new belt may be used in coolers at −75°C (−103°F), as well as in drying chambers at + 200°C (+392°F).

Moreover, the conveyor has a high resistance to wear. The weight of the belt is low and thus it is possible also to design and build very wide belts.

Such a belt is extremely easy to repair. The individual panel members can be replaced rapidly.

Finally, by using plastic material, it is possible to use transparent panel members. It is possible with the aid of a lamp arranged below the platform if necessary, to check whether the belt is "acid," which is of great importance for the canned goods industry in certain cases.

Objects located on the platform conveyor can be pushed off the conveyor very easily from the top of the belt. The platform conveyor is so stable by itself that supports can be eliminated to a large extent.

An embodiment of the invention is represented in the drawings and described below in detail.

FIG. 1 shows panel members according to the invention in a top plan view;

FIG. 2 is a sectional view of a panel member taken along line 2—2 of FIG. 1;

FIG. 3 is a sectional view of a panel member taken along line 3—3 of FIG. 1 and

FIG. 4 is an end view of a panel member taken along line 4—4 of FIG. 1.

As seen in the figures panels 1 are provided on opposite edges which may be the leading and trailing edges respectively with the closed eyes 2. The eyes comprise cylindrical members with central openings and are integral with and form one unit with the panels 1. The eyes 2 form a smooth surface with the top sides of the upper surface, or panels. The points of engagement of the eyes 2 at the panels 1 are designed so stably that a high traction can be exerted on the panel members without the danger of cracks or fractures occurring.

The eyes 2 at the opposite edges of a panel are staggered in relation to each other so that adjacent panels 1 can easily be connected by inserting the eyes of one panel into the gaps between the eyes of the next panel with the aid of articulated rods (not shown).

In the gaps between the eyes 2 the panel 1 has a protruding edge 3 recessed in the form of a circular arc for receiving the eye of an adjacent panel and with a sharp point 4. The edge embracing the eye 2 on its upper surface as it is placed into the gap laterally. The upwardly extending point 4 extends to the apex point 5 of the eye 2 to be inserted. Thus an absolutely smooth surface is created also in the connective zones between the panels.

Round protrusions 6 are provided at the side or lateral edges of the panels on end walls 8 and round holes 7 therein coact with these protrusions in a juxtaposed panel to allow for lateral assembly of the panels.

Because the eyes and gaps are placed into each other with the smallest tolerances, any gaps or crevices are avoided where dirt could collect. Thus the belt operates particularly hygienically.

The conveyor belt according to the invention moreover can be used in all temperature ranges; for high temperatures (up to 200°C) it is possible to add to the plastic material asbestos powder to increase the thermal resistance and for low temperatures (down to −75°C) it is possible to use polysulphones, for example, as the plastic material.

By using plastic with its known good sliding properties on steel the conveyor belt according to the invention can be used advantageously even without lubrication.

Various features of the invention are set forth in the appended claims.

I claim:

1. In a platform conveyor, the combination comprising a plurality of flat panel members of plastic material articulated together along transversely extending edges thereof, an upper surface on each of said flat panel members to support a load, said panel members having openings therein, a plurality of eyes formed along each transversely extending edge of each of said panel members, said eyes being apertured and the eyes of adjacent panel members being aligned to receive an interconnecting hinge member to connect said panel members together, the eyes on one transversely extending edge of each panel being staggered relative to the eyes on the opposite edge thereof, each of said eyes being positioned to extend below said upper surface of its associated panel and having a substantially circular cross section, said opposite panel edges having spaces formed between said eyes for receiving the projecting eyes of an adjacent panel, curved undercut tip walls formed along said panel edges at said spaces for receiving therein upper quadrants of said eyes of an adjacent panel member, transversely extending ends of said tip walls being located at the top of said eyes received therein, said curved tip walls having an undercut curvature substantially equal to the outer diameter of said eyes and having an arcuate length of about one quadrant, said eyes fitting snugly within said eyes defining said recesses, each of said eyes having a transverse width substantially equal to the width of one of said receiving spaces so that the panel members are intermeshed and closely fitted, said eyes of adjacent panel members extending in transverse, parallel rows across the width and adjacent to end edges of said conveyor, said eyes having a substantially greater thickness and depth than said portion of said panel member therebetween and adding rigidity and stability to said conveyor, and depending end walls depending below the lower surface of said panel members and joined to said eyes adjacent said end edges of said panel members and having a depth greater than the depth of said portion of said panel members and thereby adding rigidity to said panel members, and mating pins and holes on said end walls of said laterally adjacent panel members interconnecting the same.

2. A platform conveyor according to claim 1 wherein said panel members are translucent.

* * * * *